Figure 1:
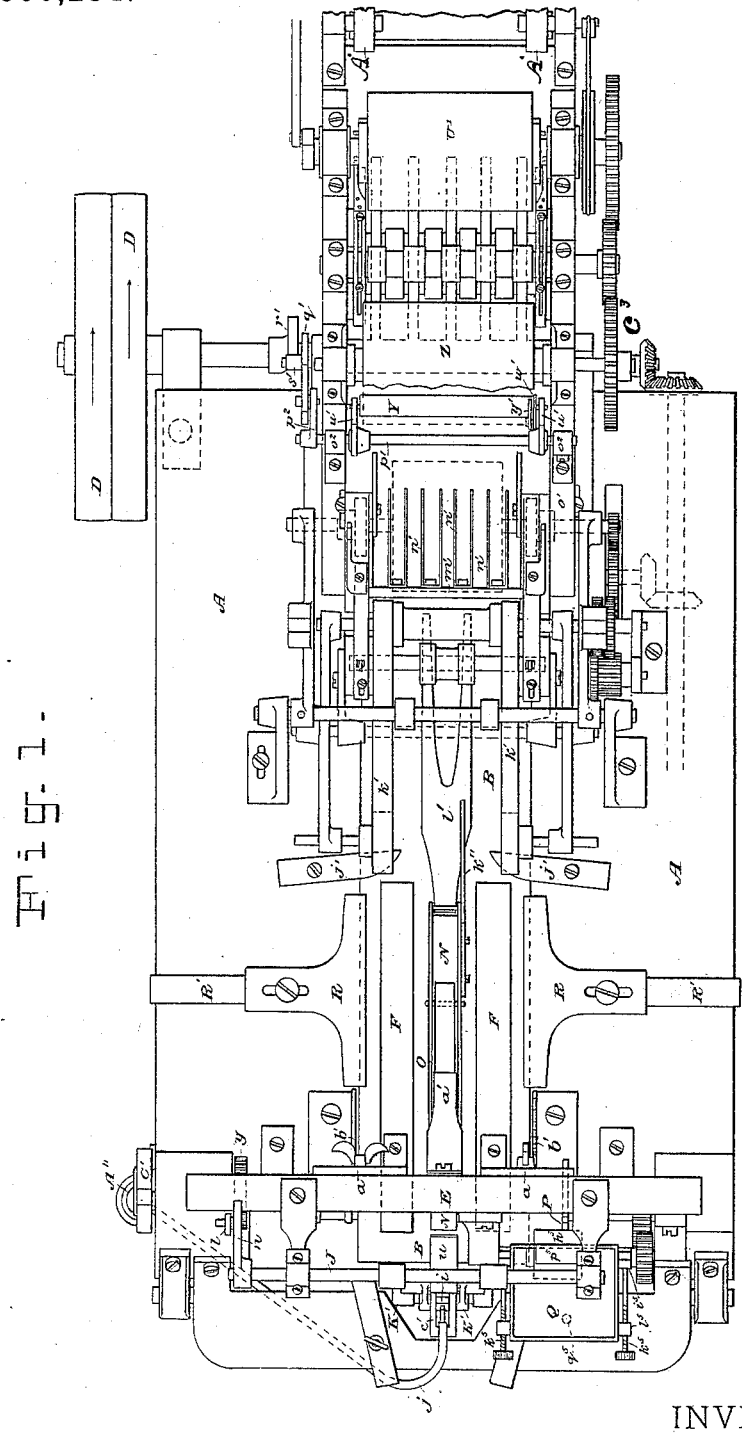

(No Model.) 6 Sheets—Sheet 1.

G. SICKELS, Jr.
MACHINE FOR MAKING ENVELOPES OR SIMILAR RECEPTACLES.

No. 398,284. Patented Feb. 19, 1889.

WITNESSES:
E. B. Bolton
J. Raplinger.

INVENTOR:
Gerard Sickels Jr.
By his Attorney,
Henry Connett

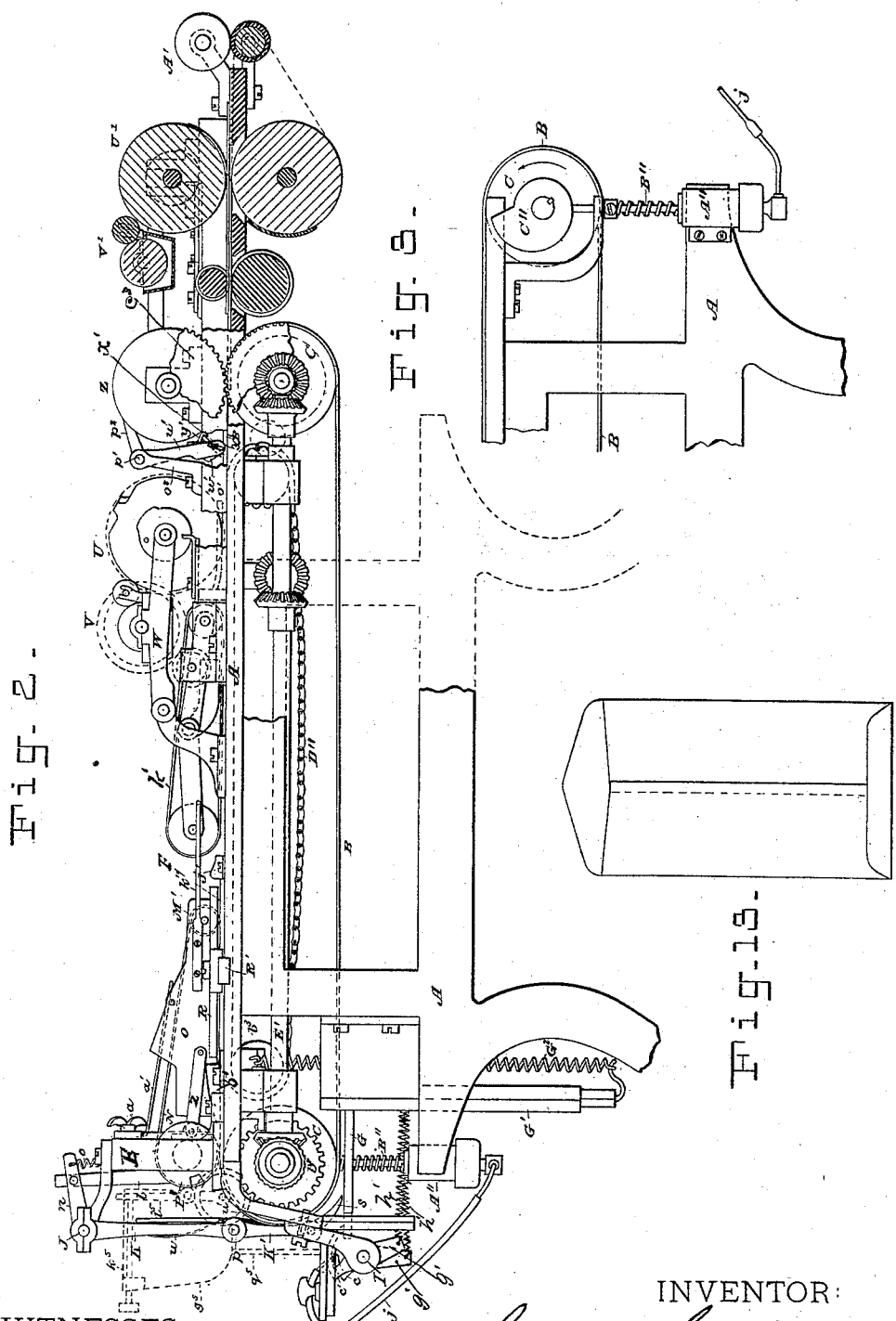

(No Model.) 6 Sheets—Sheet 3.
G. SICKELS, Jr.
MACHINE FOR MAKING ENVELOPES OR SIMILAR RECEPTACLES.
No. 398,284. Patented Feb. 19, 1889.
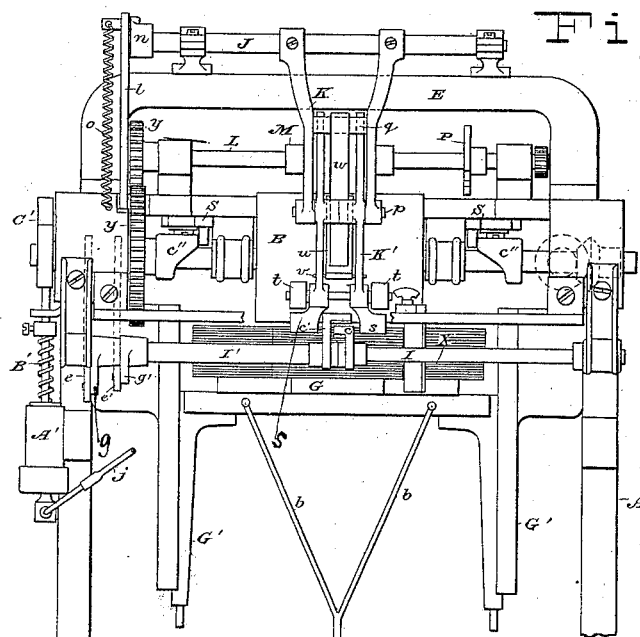
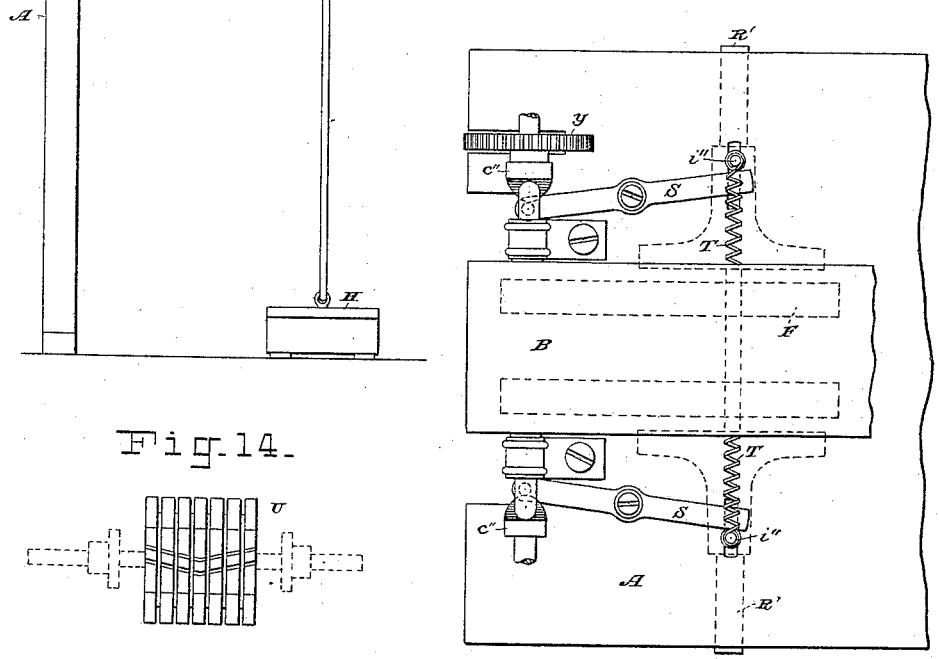
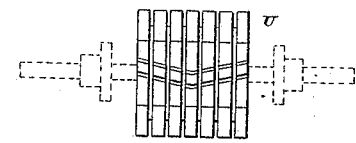
WITNESSES:
E. B. Bolton
J. O. Hapenger
INVENTOR:
Gerard Sickels Jr.
By his Attorney,
Henry Connett (No Model.) 6 Sheets—Sheet 4.
G. SICKELS, Jr.
MACHINE FOR MAKING ENVELOPES OR SIMILAR RECEPTACLES.
No. 398,284. Patented Feb. 19, 1889.
Fig. 4.ᵇ
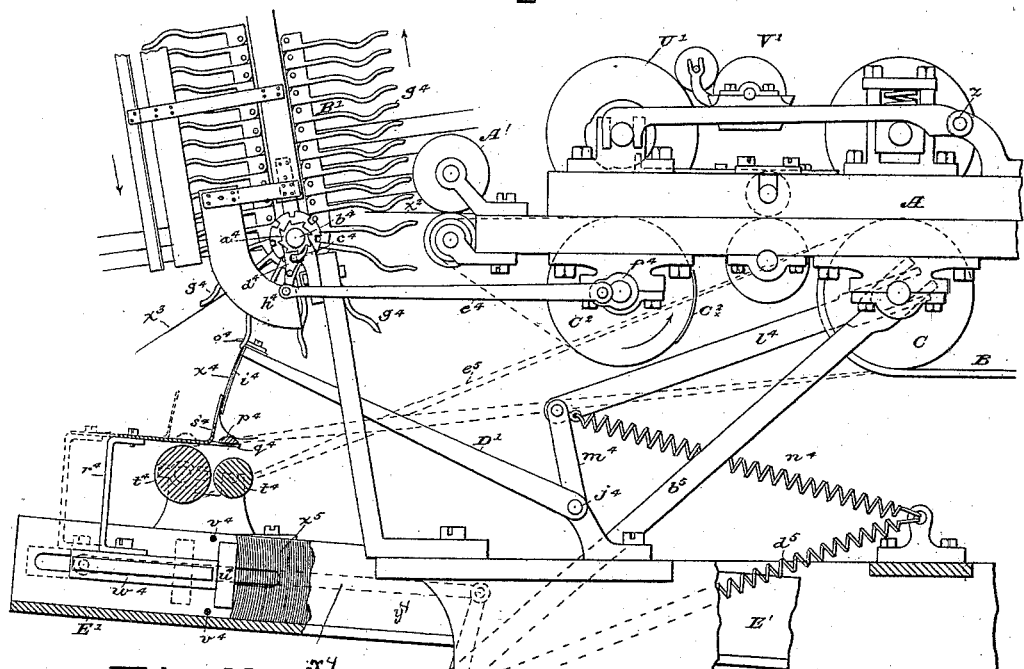
Fig. 15.ᵃ
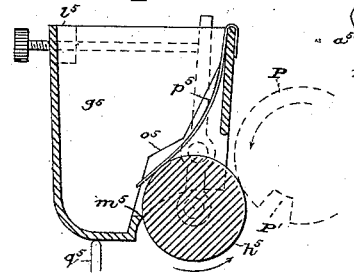
Fig. 4.ᶜ
Fig. 4.ᵉ
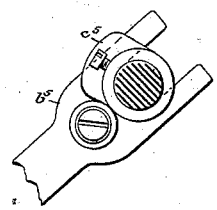
Fig. 15.
Fig. 4.ᵈ
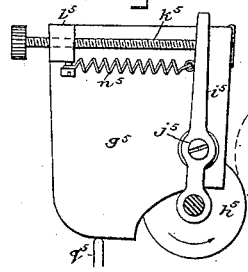
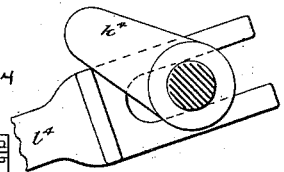
WITNESSES:
E. B. Bolton
INVENTOR:
Gerard Sickels Jr.
By his Attorney,
Henry Connett

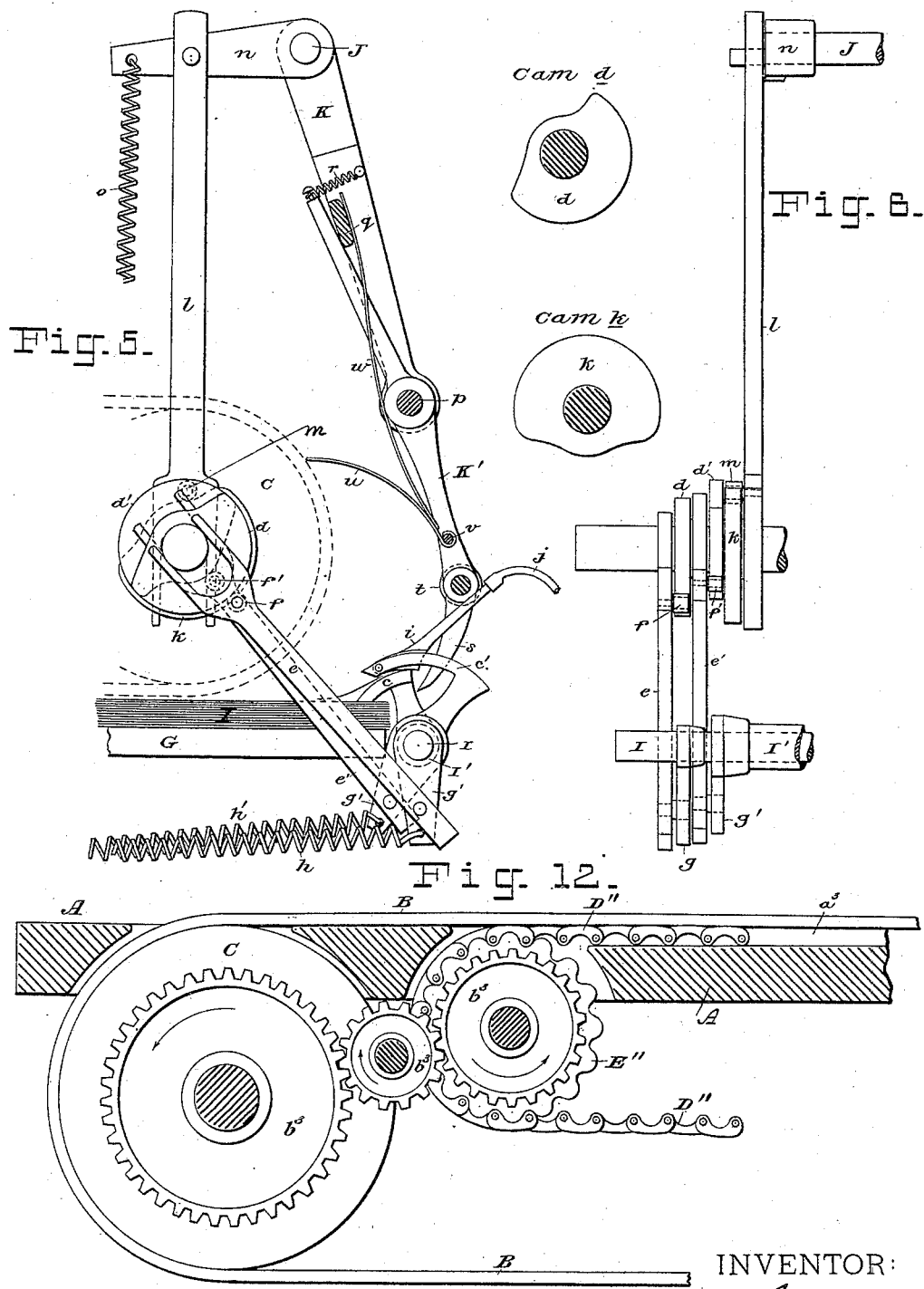

(No Model.) 6 Sheets—Sheet 6.
G. SICKELS, Jr.
MACHINE FOR MAKING ENVELOPES OR SIMILAR RECEPTACLES.
No. 398,284. Patented Feb. 19, 1889.
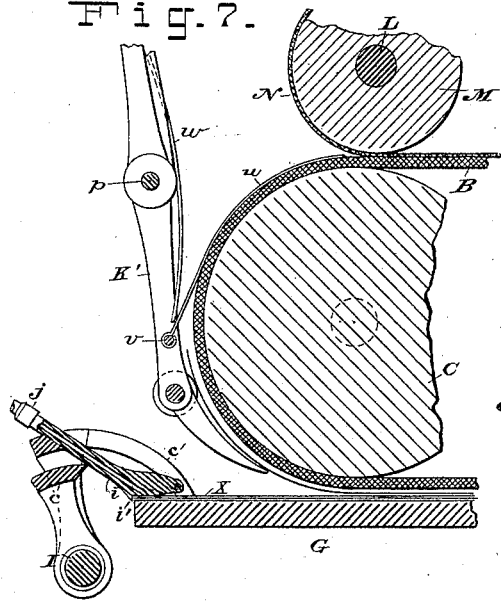
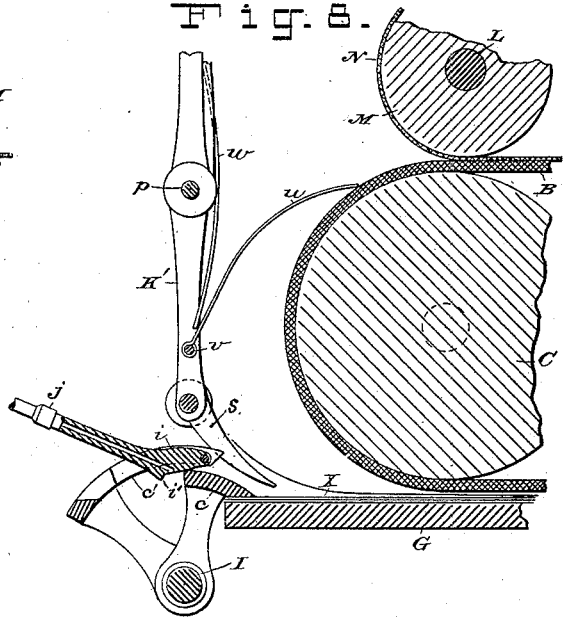
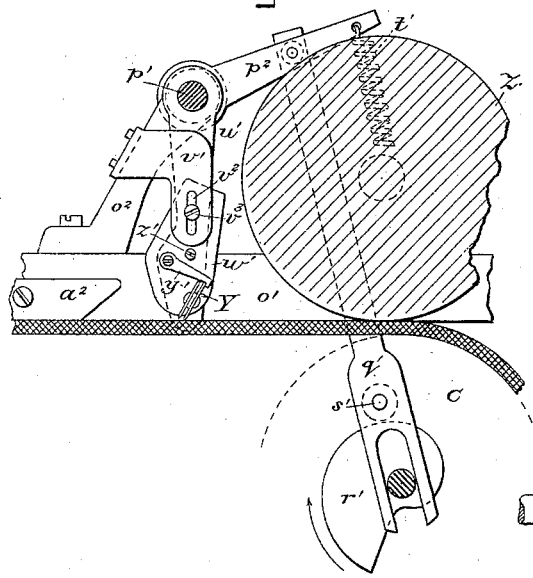
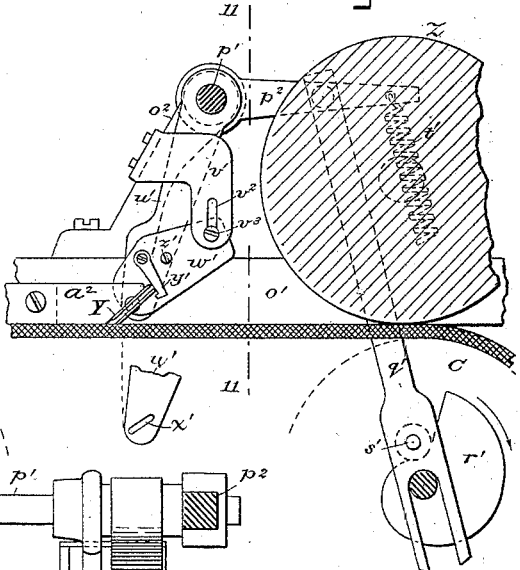
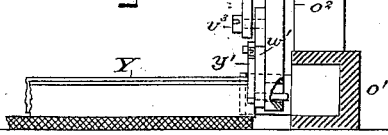
WITNESSES:
E. B. Bolton
INVENTOR:
Gerard Sickels Jr.
By his Attorney,
Henry Connett

UNITED STATES PATENT OFFICE.

GERARD SICKELS, JR., OF BROOKLYN, NEW YORK, ASSIGNOR OF ONE-HALF TO ABEL T. HOWARD, OF SAME PLACE.

MACHINE FOR MAKING ENVELOPES OR SIMILAR RECEPTACLES.

SPECIFICATION forming part of Letters Patent No. 398,284, dated February 19, 1889.

Application filed January 29, 1887. Renewed May 23, 1888. Serial No. 274,817. (No model.)

*To all whom it may concern:*

Be it known that I, GERARD SICKELS, Jr., a citizen of the United States, residing at Brooklyn, Kings county, New York, have invented certain Improvements in Machines for Making Envelopes or Similar Receptacles, of which the following is a specification.

My invention relates to improvements in that class of machines which are employed for making envelopes, bags, or other receptacles from paper and similar materials.

In my Letters Patent No. 271,282, of January 30, 1883, and No. 307,079, of October 21, 1884, I described and claimed machines for this purpose; and my present invention relates to further improvements on the machines described in my said Letters Patent.

My invention will be hereinafter fully described, and its novel features carefully defined in the claims.

In the drawings which serve to illustrate my invention, Figure 1 is a plan of the machine with the gum-roller and gum-fountains for the sealing and the bottom flaps removed to avoid obscuring other parts. Fig. 2 is a view of the right-hand side of the machine, mainly in elevation, but the rear end of the machine in longitudinal vertical section. I have been compelled for lack of room to omit from Figs. 1 and 2 the mechanism for folding the sealing-flap of the envelope. Fig. 3 is an elevation of a part of the left-hand side of the machine, designed to show the pneumatic device for effecting the suction. Fig. 4 is an elevation of the front end of the machine. Fig. $4^a$ is a view of the under side of the machine table or bed, designed to illustrate the mechanism for operating the lateral folders. Fig. $4^b$ is a side elevation, partly in section, of the rear end of the machine and illustrating the mechanism for gumming and folding the sealing-flap of the envelope and delivering the latter. Fig. $4^c$ is a rear view of that part of the machine seen in Fig. $4^b$. Figs. $4^d$ and $4^e$ are detached views showing the cams for actuating the flap-folding mechanism seen in Fig. $4^b$. Figs. $4^b$ and $4^c$ are on a little larger scale than Figs. 1 to $4^a$, and Figs. $4^d$ and $4^e$ are on a still larger scale. Figs. 5 and 6 are views on a large scale, detached, illustrating the cam mechanism for operating the blank separating and feeding devices. Figs. 7 and 8 are detached sectional views, on the same scale as Figs. 5 and 6, illustrating the construction and operation of the blank separating and feeding mechanisms. Figs. 9, 10, and 11 are sectional views, on a large scale, illustrating the construction and operation of the mechanism for positively actuating the tumbler. Fig. 12 is a sectional view, on a large scale, showing the mode of mounting and driving the chains under the main carrying-belt. Fig. 13 is a view showing the style of envelope or receptacle the machine illustrated is designed to make— that is to say, a receptacle with its mouth and closing-flap at the end instead of at the side. Fig. 14 is a plan view of the gumming-roller U, detached, showing the circumferential grooves in same. Figs. 15 and $15^a$ are respectively a side elevation and vertical section of the gumming mechanism, that will be hereinafter described.

I will only briefly describe or refer to those features of my present machine that are substantially the same as those described in my before-mentioned patents.

The operative mechanism is mounted on a suitable bed, table, or frame, A, usually of metal, in order to insure strength and stability.

B is the main endless carrying-belt mounted on rollers or drums C C, which are driven in unison positively through the medium of toothed gears in substantially the same manner as the corresponding parts of the machine described in my last-named patent, power being applied to the axis of one of said rollers through the medium of tight and loose pulleys D.

E is a fixed frame mounted on bed A, and F F are thin folding-blades for folding the lateral or side flaps of the receptacle, secured adjustably to frame E by thumb-screws $a$ $a$. These blades stand just far enough above the carrying-belt B to permit the blanks to pass under them.

G is the blank-platform, mounted in suitable vertical guides, G', so that it may play up and down, and $G^2$ are the springs which hold said platform up.

In Fig. 4 I have shown a treadle, H, and cords $b$, which connect it with the blank-platform, whereby the latter may be lowered conveniently by the foot, so that a supply of blanks may be placed thereon.

In Figs. 5, 7, and 8, X represents the pile of blanks on said platform.

The above-named features of the machine are much the same as those described in my former patent.

The general operation of the machine is as follows: The topmost blank is separated or "individualized" by a separator, and then fed into the machine (at the left-hand end in Figs. 1 and 2) by a feeder. Then the side flaps or lateral flaps are folded by reciprocating lateral folders. Then the gum is applied for the bottom or end flaps. Then a tumbler folds down this latter flap and a roller presses down and seals it fast to the envelope-body. Then gum is applied to the sealing-flap and the envelope transferred to an endless-chain carrier. This carrier is long enough to allow the gum on the sealing-flap to become dry by the time the envelope reaches the folder. The folder takes the envelope from the carrier, folds the sealing-flaps, and delivers the finished envelope into a box-like receptacle. Before the blank reaches the folders that turn the side flaps a gum-roller applies the necessary gum to one of these flaps to seal it down on the other. The gumming apparatus employed for this purpose has some novel features. I employ herein the same precautionary device for preventing the application of gum to the carrying-belt when no blank is passing the gumming-roller that I showed and described in my last-named patent, and as this forms no part of my present invention I need not describe it. The device is, however, illustrated in Fig. 1.

Referring to Figs. 1, 2, 3, 4, 5, 6, 7, and 8, I will now describe the blank separator and feeder.

Mounted to oscillate in suitable bearings on the bed A is a shaft, I, which carries a presser-foot, $c$, and mounted to oscillate on this shaft I is a tubular or sleeve shaft, I', which carries another presser-foot, $c'$. One or the other of these presser-feet rests on the pile of blanks X at all times, and thus limits the upward movement of the blank-platform by resisting the springs $G^2$, which tend to raise the same. The presser-feet $c c'$ are given alternate oscillatory movements by the mechanism seen in Figs. 5 and 6, wherein $d\ d'$ are like cams set oppositely on the axis of one of the drums C. These cams have each the form of a circular disk with a little less than one-half its periphery cut away down to the boss. $e\ e'$ are forked cam-rods, which embrace and are guided on the cam-axis, and which have laterally-projecting pins $f\ f'$, respectively, upon which the cams $d\ d'$ bear, respectively. On shaft I is an arm, $g$, and on shaft I' is an arm, $g'$. Arm $g$ is coupled to rod $e$, and arm $g'$ is coupled to rod $e'$.

Retracting-springs $h\ h'$ are connected at their one ends to arms $g\ g'$, respectively, and at their other ends to the machine-bed. Continuous rotary motion of drum C imparts alternate oscillatory movements to the presser-feet $c\ c'$. The foot $c'$ is forked, and between its prongs is pivotally mounted the sucker $i$, which has an air-passage through it and a tubular stem, whereby it is connected to the pneumatic device or air-pump (to be hereinafter described) by a flexible tube, $j$. The operation of this blank-separating device is well illustrated in Figs. 7 and 8, the former of which shows the feeder in the act of feeding the blank to the machine and the separator in the act of picking up the next blank, and the latter the feeder as having just taken the blank from the separator while the presser-foot $c$ is holding down the blanks and platform. First, the foot $c'$, bearing the sucker $i$, moves forward and presses down upon the topmost blank, the foot $c$ drawing back out of the way. (See position in Fig. 7.) Then the air is exhausted, and the topmost blank caused to adhere to the sucker $i$. The foot $c$ now advances and acts on the under side and rear of the sucker as a cam, raising the latter up and swinging it on its pivot. The foot $c$ is enabled to move under the sucker $i$ with a wiping motion without danger of catching against and detaching the blank therefrom by reason of a heel, $i'$, on the sucker, which serves as a protector or guard. As the tip of the topmost blank is thus bent upward, (being attached to the sucker,) the foot $c$ passes under said blank and separates it from the pile X. The foot $c'$ now starts back, and the foot $c$ is left pressing on the blanks. The feeder at this time comes into play. This comprises the following-described mechanism:

On a shaft, J, mounted to oscillate in bearings in brackets on the frame E, is fixed a frame, K. This frame is caused to vibrate by means shown in Figs. 5 and 6, which comprise a cam, $k$, on the axis of drum C, and a forked cam-rod, $l$, bearing a pin or stud, $m$, against which the cam impinges. The end of this cam-rod is coupled to an arm, $n$, fixed to shaft J. The cam $k$ rocks the shaft J in one direction, and a suitable spring, $o$, (seen in Fig. 4,) serves as a retracting-spring to rock it in the opposite direction. Hung in the vibrating frame K, on a rod, $p$, is a frame, K', the upper end of which bears against a cross-bar, $q$, in frame K, being held up to said bar by springs $r$. The lower end of frame K' consists of two concave feeders $s\ s$,—one at each side of the presser-feet $c\ c'$. When frame K is vibrated, these feeders $s\ s$ take under the separated blank and move it forward and up to the carrying-belt B, where the latter breaks over the drum C, as seen in Figs. 7 and 8.

The object in mounting frame K' in frame K and providing the springs $r\ r$ is to permit the feeders $s$ to press the blank up to the carrying-belt elastically; otherwise the frames K and K' might be in one, or be connected rigidly together. The feeders $s$ $s$ do not actually press the blank against the belt B. This is done by two rollers, $t$ $t$, carried by frame K'. In order to keep the blank up close to the carrying-belt B as the latter feeds it forward, and in order to insure the blank being seized between the carrying-belt and the upper belt, (to be hereinafter described,) I employ a curved guide-plate, $u$, hinged at $v$ in the frame K', and its free end resting on the belt B. This guide-plate is kept pressed lightly and elastically up to the belt B by a spring, $w$.

A shaft, L, is rotatively mounted in frame E directly over the axis of drum C, and driven positively from same by gears $y$ $y$. (See Fig. 4.) On this shaft is fixed a pulley, M, over which passes an endless belt, N, which, on the lower side, is in surface contact with the carrying-belt B, and moves with the same speed as the carrying-belt. The belt N passes around another pulley, M', which is mounted in a frame, O, that is coupled to frame E by links $z$ $z$, and pressed down by a spring, $a'$, mounted on frame E. This spring keeps the lower horizontal side of belt N pressed down elastically on the carrying-belt B. When the feeders $s$ $s$ roll the end of the blank up to the carrying-belt and the rollers $t$ $t$ press it against said belt, the latter by frictional contact carries the blank upward from the pile X under the guide $u$, and into the "bite" of the belts B and N. These belts now carry it onward (to the right in Figs. 1 and 2) under the folding-blades F F. As the blank is fed forward bottom end first, gum is applied to one of the side flaps by a gumming-roller, P, mounted on the shaft L, and standing in the proper position to apply the gum to the margin of the flap in form of a stripe. This roller P receives gum from the roller of a gumming apparatus, Q. (Seen in Fig. 1.) I have shown this fountain in Fig. 2 in dotted lines, in order to avoid obscuring the parts behind it. It will be described hereinafter with reference to Figs. 15 and 15<sup>a</sup>. The roller P has certain peculiarities, which I will now describe. The shaft L, carrying this roller, makes one revolution for each passing blank, and the roller has of course a peripheral speed that equals the speed at which the blank moves. The peripheral measurement of the roller exceeds the length of the longest envelope made on the machine, and a part of its periphery is cut away at P', the portion remaining measuring a little less than the length of the lateral flap, to which gum is to be applied, as it is not desirable to allow the stripe of gum to extend quite to the ends of the flap. This roller will be changed for envelopes of different lengths, the several rollers employed differing only in the width of the space P'.

The roller may be set along shaft L at any point to adapt it for envelopes of different widths. As the blank passes the lateral folders, the lateral flaps are folded over thereby. R R are these lateral folders, which are mounted on sliding plates R' R', that play in slots in the table or bed A. I usually mount the folders adjustably on the plates R', and they are arranged to move in a plane a little above the folding-blades F, so as to fold the flaps of the blank neatly over the latter. $b'$ are inclines or "lifters" secured to the table just ahead of the gumming-roller P. These are designed to raise the lateral flaps high enough to pass over or clear the ends of the folders R.

The mechanism which operates both folders R simultaneously is best seen in Figs. 4 and 4<sup>a</sup>. As the folders are actuated by like mechanisms, I need only describe one. On the axis of the drum C is mounted a cam, $c''$, which acts on a pin or stud in one end of a lever, S, pivotally mounted on the under side of table A. The other end of lever S bears against the side of a stud, $i''$, in the under side of the sliding plate R', carrying folder R. A spiral spring, T, connects the two studs $i''$ $i''$, and thus tends to draw the folders R inward. Now the cams $c''$, acting through levers S, move the folders R outward simultaneously, and when the blank reaches the proper position— that is, between the folders—the cams release their respective levers and the spring T instantly draws in the folders and folds the lateral flaps of the blanks.

In machines for making short envelopes, or "commercial" envelopes, where the folders R serve to fold the end flaps, these folders may have an oscillatory movement, instead of a movement in a right line in guides.

As the partly-folded blank in its onward travel passes from the folding-blades F, its advancing angles or corners pass under guides $j'$ $j'$, secured to the table A, which lead or guide the lateral folded edges of the blank, respectively, under two endless belts, $k'$ $k'$, arranged on rollers over the carrying-belt B. These belts serve to feed the blank forward by keeping it down to the belt B, and at the same time leave the lateral flaps free to fold the one on the other, the gummed flap folding down on the ungummed flap. To insure the ungummed flap folding down first, the gummed flap is held up for a little space by a rod, $k''$, attached to frame O, or some similar device. The thin forked plate $l'$, which is attached to the front end of the frame O and rests lightly on the belt B, stands, of course, between the face and back plies of the folded blank as the latter passes over it. It forms a part of the device for preventing the gumming of the belt when no blank is passing.

The blank now passes to the mechanism for applying gum to the bottom flap. This consists of an ordinary gumming-roller, U, and a fountain, V, mounted in a frame, W, hinged in brackets mounted on the machine-bed. The fountain will require no description. In order to prevent the blank from adhering to the gumming-roller U, as it may do where thin or flimsy paper is employed, I usually employ some form of stripper to prevent this. I will briefly describe that herein shown, premising that it forms no part of my invention. A cross-bar, $m'$, extends over the belt B, and to this are attached fingers $n'$, which extend out over the belt B and a little above it and under the gumming-roller U. In order that the said fingers may not interfere with the proper contact of roller U with the body of the passing blank, peripheral grooves are formed in the face of said roller, corresponding in position with said fingers, and the "lands" between said grooves pass down between the fingers. The grooved gumming-roller is seen detached in Fig. 14. The fingers $n'$ hold the blank down and strip it from the revolving roller. The gummed bottom flap of the blank next passes into the "tumbler," which is the device shown and described in my former patents for folding this flap. Formerly this tumbler was actuated solely by the blank itself, being to this extent automatic. I find that this cannot be relied on when the blanks are of thin or flimsy paper, and I have herein shown a mechanism for giving a positive movement to the tumbler.

Referring particularly to Figs. 9, 10, and 11, $o'$ $o'$ are side strips on the table A, and $o^2$ $o^2$ are brackets on the same, in which is rotatively mounted a shaft, $p'$. On the end of this shaft is an arm, $p^2$, to which is coupled the upper end of a cam-rod, $q'$, the lower end of which is forked and guided on the axis of the drum C at that end of the machine. On this is fixed a volute cam, $r'$, which operates against a stud, $s'$, on the cam-rod. This cam, in connection with a retracting-spring, $t'$, attached at one end to arm $p^2$ and at the other to some fixed part, serves to vibrate said arm and oscillate the shaft $p'$.

Fixed on shaft $p'$, just inside of its bearings, are two like arms, $u'$ $u'$, in which is mounted the tumbler Y, which in itself is constructed the same as that described in my former patent. As both ends of the tumbler are mounted in the same way, I have only shown in Figs. 9, 10, and 11 the devices wherein and whereby it is mounted at one of its ends.

To the bracket $o^2$ is fixed an elbow-like bracket, $v'$, having a slot, $v^2$, formed in it, and to this bracket $v'$ is coupled a plate, $w'$, by means of a screw or stud, $v^3$, passing through slot $v^2$. The tumbler is journaled in plate $w'$, the journal on its end also passing through and playing in a slotted bearing, $x'$, in the small figure below Fig. 10 in the lower free end of arm $u'$. Pivoted to the plate $w'$ is a gravity-latch, $y'$, which is designed to hook over and turn the tumbler, as indicated in Fig. 9. A stud, $z'$, on plate $w'$ prevents the latch from being thrown up too high.

The operation is as follows: Suppose the higher part of cam $r'$ has passed stud $s'$ and spring $t'$ has drawn down arm $p^2$. The several parts will then stand as in Fig. 10, the tumbler being held up to the inclined stop $a^2$ in position to receive the flap of the blank. The blank passes into the tumbler, and at this moment the cam $r'$ begins to swing back the arms $u'$ and carry the tumbler back along with the blank. This is the position seen in Fig. 9. As the arm $u'$ swings back beyond the pendent branch of the fixed bracket $v'$, on which plate $w'$ is pivoted, the latch $y'$, which is mounted on said plate, holds back the upper edge of the tumbler, but allows its lower edge to move on, thus essentially bringing the tumbler first to a vertical position, and then causes it to topple over backward or toward the left in Fig. 9. The slot $x'$ in arm $u'$ will now stand with its long axis about vertical, and when the tumbler topples over, this arrangement of slot $x'$ permits the tumbler to fall. At this moment, however, the cam $r'$ again passes the stud $s'$, and spring $t'$, which has been under tension, instantly returns the parts to the position seen in Fig. 10, thus slipping the tumbler off the folded flap of the blank and returning it to the proper position to receive the next blank. In returning the tumbler "jumps" over the wet gum on the body of the envelope. The blank now passes under the pressure-roller Z, which presses or seals down the flap folded by the tumbler and smooths and delivers the envelope to the roller that applies gum to the sealing-flap. Roller Z is driven from the drum C immediately below it through the medium of toothed gears $c^3$.

Fig. 11 is a section on line 11 11 in Fig. 10 and shows the parts $o^2$, $v'$, $u'$, and $w'$ in edge elevation.

From the roller Z the envelope passes to a gumming-roller, U', which applies gum to the sealing-flap, provided the envelopes are designed to be "self-sealing." It will not be necessary to further describe this device than to say that roller U' is or may be the same as roller U, that it may be supplied with gum from a fountain, V', similar to fountain V, and that between roller Z and roller U', I may and usually do arrange a mechanism to prevent the application of gum to a bearing-roller, $C^2$, when no blank is passing. This mechanism is or may be the same in principle as that described in my former patent, and will therefore require no description. The bearing-roller $C^2$ may have on its face rubber (or other) type, indicated at $C^x$ in Figs. 2 and $4^b$, for printing a business-card on the face of the envelope as the latter passes over it. I have not shown the ink-fountain and roller for supplying ink to the type, as such are well known. After the envelope passes from under the gumming-roller U', it is seized and carried on by pairs of small roller A', which take it by the edges, so as to avoid the wet gum on the sealing-flap, and deliver it onto an endless-chain carrier, B'. (Seen in Fig. $4^b$.) This carrier is or may be of the kind usually employed in envelope-machines, and is arranged at the rear end or delivery end of the machine. It moves intermittently and receives an impulse for each envelope delivered through the medium of a pawl-and-ratchet device. This device, as shown in Fig. 4$^b$, comprises a ratchet-wheel, $a^4$, on the driving-shaft $b^4$ of the carrier B', a pawl, $c^4$, carried by a radial swinging arm, $d^4$, which pawl engages said ratchet-wheel, and a connecting-rod, $e^4$, one end of which is coupled to arm $d^4$, and the other end of which is coupled to a short crank, $f^4$, on the axis of roller C$^2$. The direction in which carrier B' moves is indicated by the arrows in Fig. 4$^b$, wherein $x^2$ indicates an envelope that has just been delivered into said carrier by rollers A'; $x^3$, envelopes in the carrier on their way down to the folder; $x^4$, an envelope that has been removed from the carrier by the folding mechanism, and $x^5$ envelopes completed and delivered into the receiving-box.

I will say here that the rollers A', that bear on the extreme ends of the envelope, are not connected by a shaft, the space between them being left open for the gummed sealing-flap of the envelope to rise up when the envelope is carried upward by carrier B'.

I will now describe the folding mechanism and the operation of folding the sealing-flap of the envelope, premising that the envelope with its flap gummed is carried up by the carrier (on the right side in Fig. 4$^b$) as far as the carrier extends, and then down again (on the left side in Fig. 4$^b$) to be folded. The carrier will be of the proper length to retain the envelope until the gum on the flap is dry or sufficiently so. As the envelopes $x^3$ descend, they finally reach the point where the carrier "breaks" around shaft $b^4$, and the fingers $g^4$ of same begin to spread apart. Here I provide a means for preventing the envelopes from dropping out of the carrier, which they would otherwise do, as soon as the fingers loosen their hold. This device consists merely of two side plates, $h^4$, set at the proper distance apart to embrace the envelopes edgewise (or endwise, as the case may be) as they move along. These plates are lined inside with some soft material, preferably plush or other pile fabric, which, by its contact with the ends of the envelopes, prevents their falling out of their own weight, but permits the fingers to move them along to the delivery-point. Fig. 4$^c$ is a rear elevation or back view of this portion of the mechanism, showing how the lining of plush contacts with the envelope. When an envelope has reached the delivery-point, it stands with the sealing-flap projecting downward and with the face of the envelope toward the left in Fig. 4$^b$.

D' is a hoe-like folder provided with a folder-blade, $i^4$, which at the upper end of its stroke stands quite close up to shaft $b^4$. The arm of folder D' is fixed to a rock-shaft, $j^4$, and this shaft is rocked and the folder vibrated by a cam, $k^4$, (seen in Fig. 4$^d$,) on the axis of one of the drums C. This cam acts through a cam-rod, $l^4$, and an arm, $m^4$, on the rock-shaft $j^4$, to which arm said rod is coupled. A spring, $n^4$, retracts the folder after the cam has passed. On the heel of the folder-blade $i^4$ is formed a projecting lip, $o^4$, which serves as a gage and pusher.

The operation is as follows: While the folder-blade is moving upward the fingers of carrier B' are moving forward, and after the folding-blade has moved up behind a pair of fingers and reached its highest point the continued movement of the fingers of the carrier B' brings an envelope up against the face of said blade, the lip extending over the upper edge (which is the bottom) of the envelope. At this moment cam $k^4$ acts on said blade, which descends, pushing the envelope downward from the carrier. Fig. 4$^b$ shows the folding-blade at a point about half-way in its downward movement. Simultaneously with this movement another has taken place. As the folder-blade descends, a device, which I will call a "deflector," comes in play. This comprises a bar, $p^4$, mounted on two arms, $q^4$, on a reciprocating frame, $r^4$, and a plate, $s^4$, also mounted on said frame. Fig. 4$^b$ shows the deflector advanced and the bar $p^4$ as having deflected the flap of the descending envelope or bent it across the path of the folder-blade. The folder-blade pushes the envelope down through the space between bar $p^4$ and plate $s^4$, this movement serving to crease the paper along the line of fold, and at the latter end of its downward movement the said blade tucks this fold between two revolving rollers, $t^4$, which seize and feed the envelopes downward and complete the folding of the flap. At the moment the rollers seize the envelope the cam $k^4$ passes and the spring $n^4$ instantly retracts the folder-blade. As soon as the folder-blade is retracted, frame $r^4$ moves back, (to the left in Fig. 4$^b$,) carrying with it a ram, $u^4$, in a box, E', arranged under the machine to receive the envelopes. When the ram $u^4$ has moved back to the position seen in the dotted lines, the envelope drops from the rollers $t^4$ into box E in front of said ram. The ram now moves forward again and pushes the envelope forward in the box beyond two cleats, $v^4$, arranged across the box E' above and below. These may be simply metal rods extending across the box. They serve as detainers to prevent the envelopes from falling back in the way of the next in succession. Thus the ram pushes on into the box one envelope after another as they are fed downward from the rollers. This form of ram and box provided with cleats is very old in this class of machines, and I do not claim it.

I will now describe the mechanism for imparting a reciprocating motion to the frame $r^4$ and ram $u^4$.

The ram is fixed to a sliding block, $w^4$, mounted to play in suitable guides in the sides of box E', and the frame $r^4$ is mounted on this block. This block $w^4$ is coupled by connecting-rods $x^4$ to arms $y^4$, fixed on a rock-shaft, $z^4$, which has another arm, $a^5$, coupled to a forked cam-rod, $b^5$, which is acted on by a cam, $c^5$, (seen in Fig. 4$^c$,) on the axis of a drum, C. The cam imparts movement in one direction to the deflector and ram, and a spring, $d^5$, imparts movement thereto in the opposite direction. The rollers $t^4$ are driven or may be driven by a belt, $e^5$, from drum C. The box E' is open at the top where the envelope enters it from rollers $t^4$, and a loose weight is placed in the box in front of the moving column of envelopes therein, in order to keep the latter in a compact mass.

Any cam mechanism may be employed for actuating the folder-blade, deflector, and ram, so long as they act in unison, as described; and the deflector might be actuated by one cam and the ram by another. The plate $s^4$ is cut out or scalloped at its top to make way or room for the outwardly-projecting flaps of the envelopes in the carrier B'. Its function is mainly to keep the body of the envelope up snugly against the outer face of the folder-blade. The fold is primarily formed by the forcing of the envelope down between the bar $p^4$ and this plate $s^4$, and it is completed by the rollers $t^4$.

Fig. 3 shows the air-exhausting device employed in connection with the sucker $i$. This is the same device as that employed in the machines described in my former patents, and will need but a brief reference, especially as any device that will effect this result may be employed.

A'' is a cylinder, in which plays a piston attached to the end of a rod, B''. To the lower end of the cylinder is connected the flexible tube $j$, leading to the sucker $i$.

Around the rod B'' is a spiral spring, which abuts at its lower end on cylinder A'' and at its upper end against a collar on rod B''. A volute cam, C'', on the axis of drum C, acts on the end of rod B'' to push down the piston and compress the spring. When the cam passes, the spring raises the piston suddenly and produces the necessary vacuum at the sucker. A bellows might be substituted for the cylinder and piston.

All belts are liable to slip on their pulleys, and I find that the carrying-belt B, which should be accurately timed in its movements in order to bring the blanks to the proper points at the proper times, is liable to be slightly retarded in its movements when any retarding pressure is brought to bear upon it. In order to avoid this defect and to provide a precautionary device, whereby the proper speed of belt B will be at all times maintained uniform, I place under said belt a series of endless chains. (Seen in Fig. 2 and illustrated on a larger scale in Fig. 12.) In the bed A of the machine, over which the belt B moves, and with which it is substantially in surface contact, I form one or more longitudinal grooves, $a^3$, deep enough to receive the endless chains D''. I prefer to have three grooves in the table under the belt B, one being arranged about the middle of the belt and the others near the margins of same, respectively. These grooves I make wide enough to receive eight or nine chains, each placed side by side; but this arrangement is not essential. At the rear end of the machine, and just in front of the drum C at that end of the machine, I mount a sprocket-drum, E'', over which the chains D'' pass, as seen in Fig. 12. This drum E'' is driven positively from drum C by suitable gearing, $b^3$, so constructed as to give the chains a speed equal to the speed of the belt B. The chains may be slack, as indicated in Fig. 2, and at the front end of the machine they pass over a simple idler roller or drum. As this latter roller is not absolutely essential, and is merely designed to support the chains at that end of the machine, I have not deemed it necessary to show it. It will be seen that the chains rise flush with the upper surface of the table or bed A, and consequently when the belt B is pressed down its under side is brought into contact over a considerable part of its surface with the moving chains instead of the non-moving bed. As the chains are moving with the same speed as that at which the belt should move, the pressure only tends to insure the continual movement of the belt and not to retard it. As the contact between the chains and the surface of the belt is merely frictional, I find it advantageous, first, to raise the chains a very little above the general level of the surface of the table, and, second, to speed them a very little faster than the belt. This latter does not necessarily throw the belt out of time, as the belt, having its own normal rate of speed, resists being driven faster.

In Figs. 15 and 15$^a$ I have shown my improved gumming apparatus, represented here as being employed to supply gum to roller P. In these figures, $g^5$ represents the fountain or receptacle for the gum, which is open at its lower front corner to receive the gum-feed roller $h^5$. This roller is rotatively mounted in arms $i^5$, which have bearings on the roller axis or shaft at their lower ends and pivotal attachments at $j^5$ to the ends of the fountain. Two screws, $k^5$, screw through lugs $l^5$ on the ends of the fountain, and their ends bear on the arms at their upper parts. When the screws are screwed in against the arms, the back edge, $m^5$, of the opening in the bottom of the fountain is brought up more or less close to the roller. Springs $n^5$ serve to keep the arms $i^5$ always pressed up elastically against the ends of the screws $k^5$. The gearing which imparts rotary motion to roller $h^5$ drives it in the direction of the arrow on it, and the space left by the adjustment between the edge $m^5$ of the fountain and the periphery of the roller governs the thickness of the film of gum on the roller, the edge $m^5$ serving as a scraper. The roller P revolves in the same direction as the roller $h^5$, so that at their points of contact they move in opposite directions. The gum-feed roller $h^5$ and the roller P for applying gum to the envelope will both be by preference of metal, and will both be in close peripheral contact. Therefore, by arranging them to rotate in this manner, roller P serves as a wiper to take the gum from the fountain-roller. Such gum as is not taken off by the roller P—it having a narrow face and the fountain-roller being a cylinder of considerably greater length—will be carried back into the gum-fountain by the roller. The fountain-roller fits snugly endwise between two flanges or ribs, $o^5$, formed integrally with the front wall or side of the fountain, and secured to the upper edge of this front wall or side of the fountain is an elastic thin plate, $p^5$, the free lower end of which rests on the fountain-roller $h^5$. This plate fits also snugly between the flanges $o^5$, and its width is equal to the length of the roller. It allows the gum carried back by the roller to pass back under it into the fountain when the roller is rapidly revolving; but when the roller is at rest it presses down snugly thereupon and prevents the gum from leaking out. The fountain is supported on the axis of the roller $h^5$, as stated; but in order to prevent it from swinging backward by rotation of the arms $i^5$ on said axis I usually support it on a rod or post, $q^5$, projecting upward from some part of the machine-frame.

I may say here that the roller P has a narrow face to apply a narrow stripe of gum to the envelope-flap, and the fountain-roller has a broad face, in order that the roller P may be set in or out to suit envelopes of different sizes, and yet be in contact with some part of the face of said fountain-roller. The roller P can be proportioned, as hereinbefore stated; or it may be of small size, and make two or more revolutions while an envelope-blank is passing. It is only important that the notch P′ in its edge shall be so set that as the envelope passes on and out from under the roller the latter shall not continue applying gum to the extreme end of the flap, but leave a little space at this end of the blank, which will eventually form the open end of the envelope. It is not so important that the stripe of gum be limited at the other end.

I do not claim notching the roller P in order to leave a space free from gum, as this is an old device in apparatuses for applying gum.

I do not wish to limit myself to the precise construction and arrangement of parts herein shown, as these may be varied to some extent. For example, the lateral folders R might have each a spring, T, instead of one spring being employed for both. The blank-platform might also be upheld by a weight, instead of a spring; but a spring, or, rather, a pair of springs, is more convenient.

Having thus described my invention, I claim—

1. In a blank or sheet separating mechanism, the combination, with a blank-platform, of two presser-feet, $c$ $c'$, mechanism, substantially as described, for imparting alternate oscillations or vibrations to same, a sucker, $i$, pivotally attached to presser-foot $c'$ and connected to an air-exhausting mechanism, and said air-exhausting mechanism, substantially as described, the said pivoted sucker being arranged in the path of said presser-foot $c$, substantially as and for the purposes set forth.

2. In a blank or sheet feeding mechanism, the combination, with means, substantially as described, for lifting and separating the blank or sheet from the pile, of a vibrating frame, K, curved feeders $s$ $s$, carried by said frame, a curved guide, $u$, carried by said frame and its free end resting on the carrying-belt, said carrying-belt, and means, substantially as described, for vibrating said frame K and for driving said carrying-belt, substantially as set forth.

3. In a blank or sheet feeding mechanism, the combination of the blank-platform and means, substantially as described, for upholding it, the alternately-oscillating presser-feet and means, substantially as described, for actuating same, the sucker pivotally connected to one of said presser-feet and adapted to be raised by the other presser-foot, the air-exhausting mechanism, substantially as described, connected with said sucker, and the vibrating feeder and its operative mechanism, substantially as set forth.

4. The combination, with the main carrying-belt B and its drums C, of the shaft L, the pulley M, carried thereby, the frame O, connected to the main frame by links, the pulley M′, mounted in frame O, the belt N, carried by pulleys M M′, and the spring $a'$, arranged to press belt N down upon the carrying-belt B.

5. The combination, with the main carrying-belt, the folding-blades F, and the lateral folders, of the two endless belts $k'$, arranged over the carrying-belt and in line with the folding-blades, and the guides $j'$ $j'$, for leading the lateral folds of the envelope under the said belts $k'$, substantially as set forth.

6. The combination, with the shaft $p'$, provided with pendent arms $u'$, and an arm, $p^2$, of means for imparting oscillating movements to said shaft, a tumbler, Y, mounted in slotted bearings in said arms $u'$, the fixed brackets $v'$, the plates $w'$, connected to said brackets by studs and slots, as described, and said tumbler journaled in said plates $w'$, and a latch, $y'$, pivotally mounted on the plates $w'$, and arranged to hook over the edge of the tumbler, substantially as set forth.

7. The combination, with the machine-bed, provided with grooves $a^3$ to receive them, of the endless chains D″, arranged under the carrying-belt, the sprocket-roller E″, over which said chains pass, the main carrying-belt B, and its drums C C, and gearing, whereby said belt and chains are driven in unison, substantially as set forth.

8. The combination of the frame K, provided with a bar, $q$, the frame K′, mounted in frame K on rod $p$, and provided with concave feeders $s$ $s$ and rollers $t$, the spring or springs $r$, connecting frames K and K′, the curved guide $u$, mounted in frame K', and its spring $w$, substantially as set forth.

9. The combination, with the carrier B', of the side plates, $h^4$, lined with plush or similar soft material and arranged at each side of the carrier at the delivery-point, substantially as and for the purposes set forth.

10. The combination, with the carrier B', of the vibrating folder provided with a folder-blade, $i^4$, and a gage or pusher, $o^4$, of a reciprocating deflector arranged to deflect the flap of the envelope across the path of the folder-blade and rollers $t^4$, arranged substantially as set forth.

11. The combination, with the intermittently-moving carrier B', of the vibrating hoe-like folder, the reciprocating deflector, comprising the bar $p^4$ and plate $s^4$, the rotating rollers $t^4$, arranged under said deflector and the folder-blade, the box or receptacle E', arranged below said rollers, and the reciprocating ram $u^4$, arranged in said box, substantially as and for the purposes set forth.

In witness whereof I have hereunto signed my name in the presence of two subscribing witnesses.

GERARD SICKELS, JR.

Witnesses:
HENRY CONNETT,
J. D. CAPLINGER.